United States Patent [19]

Price et al.

[11] Patent Number: 5,415,228
[45] Date of Patent: May 16, 1995

[54] FLUID LOSS CONTROL ADDITIVES FOR USE WITH GRAVEL PACK PLACEMENT FLUIDS

[75] Inventors: Paul A. Price, Lafayette, La.; Xiaoping Qiu, Tulsa, Okla.

[73] Assignee: Schlumberger Technology Corporation - Dowell Division, Houston, Tex.

[21] Appl. No.: 163,256

[22] Filed: Dec. 7, 1993

[51] Int. Cl.⁶ .................... E21B 43/04; E21B 33/138
[52] U.S. Cl. .................................. 166/278; 507/269; 507/277; 507/906
[58] Field of Search ............... 166/278, 305.1, 281, 166/282, 283; 252/8.551; 507/140, 113, 114

[56] References Cited

U.S. PATENT DOCUMENTS

| | | | |
|---|---|---|---|
| 3,675,717 | 7/1972 | Goins, Jr. et al. | 166/278 |
| 3,852,201 | 12/1974 | Jackson | 175/66 X |
| 3,989,632 | 11/1976 | Fischer et al. | 166/283 X |
| 4,141,843 | 2/1979 | Watson | 166/244.1 |
| 4,621,692 | 11/1986 | Mondshine | 166/278 X |
| 4,957,165 | 9/1990 | Cantu et al. | 166/300 X |
| 5,228,524 | 7/1993 | Johnson et al. | 166/282 X |
| 5,234,055 | 8/1993 | Cornette | 166/278 |

Primary Examiner—Stephen J. Novosad
Attorney, Agent, or Firm—Henry N. Garrana; Stephen A. Littlefield

[57] ABSTRACT

Improved fluid loss control in gravel pack placement fluids is achieved when a fluid loss control additive is provided comprising a selectively soluble particulate having a size of less than 1000 microns and having a linear size distribution when cumulative weight percent is plotted against the logarithm of the particle size. The preferred selectively soluble particulate comprises calcium carbonate.

8 Claims, 2 Drawing Sheets

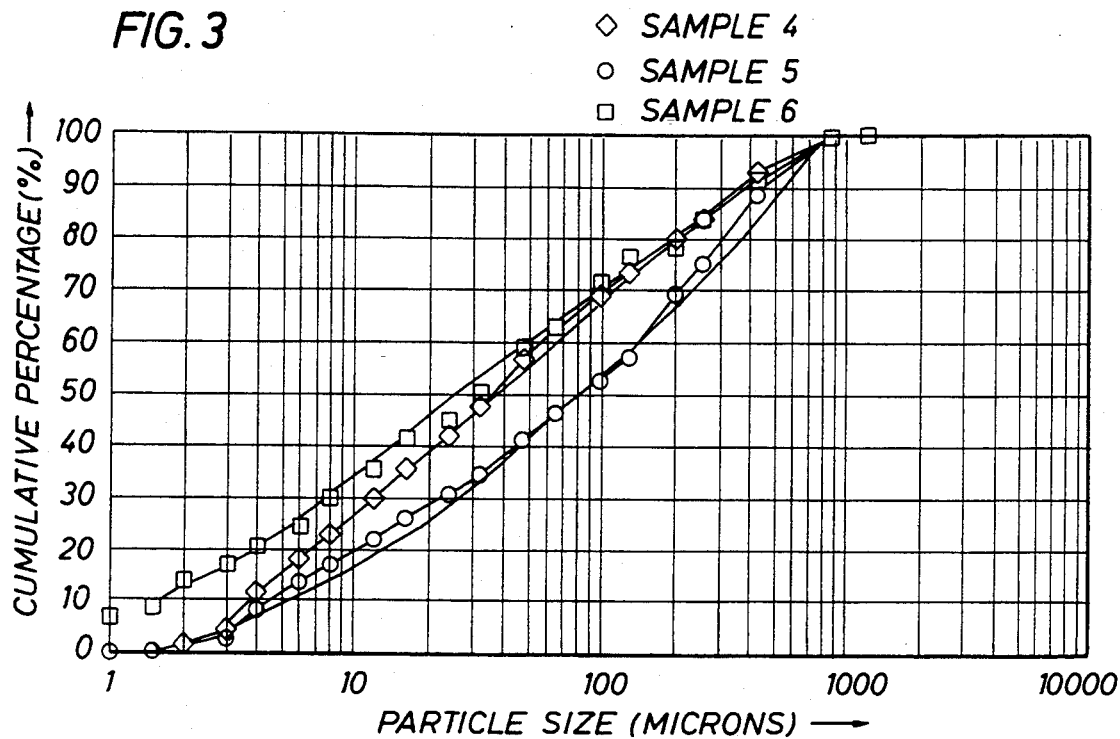
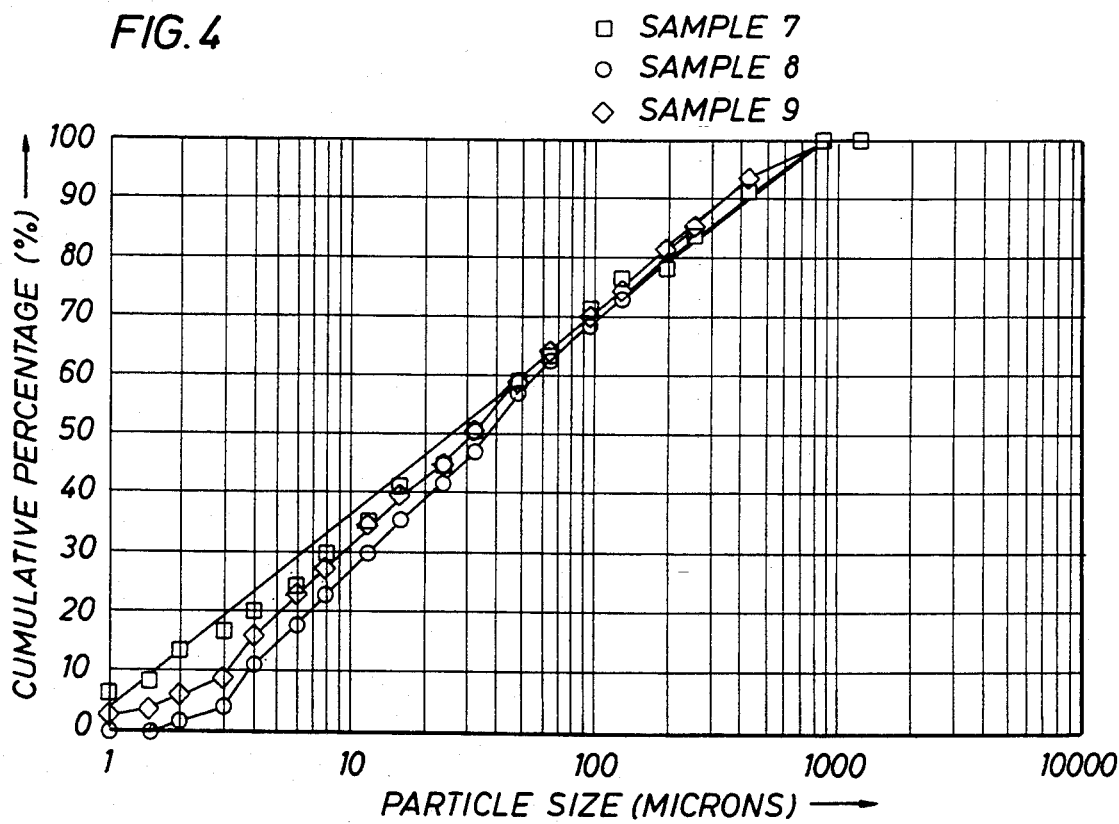

FLUID LOSS CONTROL ADDITIVES FOR USE WITH GRAVEL PACK PLACEMENT FLUIDS

This invention relates to the art of recovery of hydrocarbon values from subterranean formations and, more particularly, to a fluid loss control additive and method for its use in avoiding fluid loss during the placement of a gravel pack in an unconsolidated formation.

BACKGROUND OF THE INVENTION

In the art of well completions, subterranean formations holding hydrocarbon values such as oil and/or natural gas can comprise unconsolidated fine particulate materials. When a well penetrating such a formation is placed on production in order to recover the hydrocarbons therefrom, the fine particulate matter in the formation is carried into the well bore and can eventually block the production of hydrocarbons with silt.

In the production of hydrocarbons from such unconsolidated formations, it has been common to place a so-called gravel pack in the near well bore area. The gravel pack comprises a sized particulate, typically sand, which forms a filter bed which traps formation particulates in the interstices between the sand particles while allowing the flow of fluid hydrocarbon components to proceed to the well bore. In this manner, production of the hydrocarbon fluids can proceed for an extended period of time without a buildup of silt within the well which would otherwise inhibit or completely terminate production.

A gravel pack is typically placed in the near well bore area utilizing a well packer to isolate the desired formation and pumping the sand in a viscosified fluid through a screen or slotted liner to place the gravel pack sand in and adjacent to the well bore at the unconsolidated formation face. The placement fluid typically is viscosified by any of several natural and/or synthetic polymeric materials such as cellulosics, galactomannan gums or various synthetic polymers such as polyacrylamide. In high permeability formations however, viscous fluids alone can be inadequate to control fluid loss into the highly permeable surrounding zone. Particulate supplements are often necessary to decrease such fluid loss to the formation. Conventional particulate based fluid loss control systems are only moderately successful due to unknown downhole parameters such as permeability, pore throat size and particle size of the fluid loss control material. Additionally, clean up and removal of these materials following gravel pack placement is often difficult.

Particulate fluid loss control systems have the ability to effectively control fluid loss by forming a low permeability filter cake. While controlling fluid loss, the filter cake provides damage protection to the formation trapping incoming polymer residues and foreign particles residing in the completion fluid. Typical systems contain several individual grinds of particles combined in various job specific ratios. Job designs using the conventional systems require skill and expertise in order to cover a wide spectrum of permeabilities and still allow maximum clean up efficiency.

To increase performance, conventional particulate fluid loss control systems have utilized starch. Starch reduces filter cake permeability at the cost of clean up efficiency.

Bridging efficiency is the key to an effective leak off control additive system. Bridging must occur quickly with minimal particle invasion. The bridging mechanism is dependent upon the particle size distribution of the leak off control material. Such distributions are normally presented on a semi-log plot of cumulative weight of the leak off control material versus a log of the particle size. Typical prior particle size distributions of this type have an s-shaped curve in the aforementioned semi-log plot.

SUMMARY OF THE INVENTION

The present invention provides an improved fluid loss additive for use with viscosified gravel pack placement fluids offering excellent fluid loss control and highly efficient clean up.

In accordance with the invention, a composition for use in controlling fluid loss to a formation in gravel pack operations comprises a carrier fluid having a viscosity higher than 50 centipoise and a selectively soluble particulate of a size less than 1,000 micron and having a linear size distribution when cumulative weight percent is plotted against the logarithm of the particle size.

Further in accordance with the invention, the above selectively soluble particulate material is acid soluble.

Still further in accordance with the invention, the above selectively soluble particulate material comprises calcium carbonate.

Still further in accordance with the invention, a process of controlling fluid loss to a formation through a gravel pack comprises pumping a suspension of selectively soluble particulate material, the selectively soluble particulate material having a size less than 1,000 microns and having a linear size distribution when the cumulative weight percentage is plotted against the logarithm of the particulate size.

It is therefore an object of this invention to provide a fluid loss control material which easily and efficiently bridges over high permeability subterranean formations which cause high fluid loss and achieves a permeability of less than 5 millidarcy.

It is a further object of this invention to provide a fluid loss control material which is easily removed following the need therefor.

A BRIEF DESCRIPTION OF THE DRAWINGS

These and other objects of the invention are accomplished through the manner and form of the present invention to be described hereafter in conjunction with the accompanying drawings in which:

FIG. 1 is a graphic illustration of the particle size distribution of the preferred fluid loss control material in accordance with the present invention, and FIGS. 2–4 are graphic illustrations of the fluid loss performance of various formulations presented in the Examples.

DETAILED DESCRIPTION OF THE PREFERRED EMBODIMENT AND THE DRAWINGS

Situations arise in completion operations requiring effective fluid loss control. In the past, controlling fluid loss during completions in unconsolidated reservoirs has been an art and not a science. Industry has induced major formation damage in the interest in economy and safety of well operations. As well productivity issues receive more attention, engineers and scientists have turned a more critical eye to the behavior of fluid loss control systems.

Completion fluids are designed based upon the anticipated reservoir pressure to create a determined overbalanced condition at the perforating of the well tubing and casing. The presence of high reservoir permeability can result in significant losses of completion fluid under these conditions. Before coming out of the hole with a bottom hole assembly, it is necessary to minimize fluid loss to less than five barrels per hour, preferably less than one barrel per hour. The concept of fluid loss involves the reduction of the effective permeability and/or an increase in the viscosity of the leak off fluid. A combination of a particle and a viscous fluid is the widely accepted approach to controlling fluid loss.

Difficulty arises when it is desired to regain the permeability in the formation in the injection direction prior to gravel packing. Leak off must be reestablished for effective perforation gravel placement. Clean up efficiency depends upon both the fluid and the particle. Materials such as salt, oil soluble resins and calcium carbonate suspended in viscosified polymer solutions are the most common completion fluids used in fluid loss control. Removal of these materials in order to reestablish fluid loss for gravel packing typically involves treatment with an acid or hydrocarbon fluid to dissolve the solid materials therein. At best, clean up efficiency is in the range of 10 to 50 percent for typical systems. Such leak off control materials have been found to be nearly impossible to remove from perforation tunnels against the formation in the injection direction. Filter cakes deposited by these particulate systems provide leak off rates that are too low to permit contact by solvents or acids in order to effect their removal. Polymer systems alone allow more effective removal but the fluid loss efficiency is considerably lower thereby allowing unacceptable fluid loss rates when leakoff control is desired.

The invention relates to improvements in a fluid for and a process of controlling fluid loss to a formation through unpacked perforations in gravel packing. More particularly, it relates to improving the fluid loss control and return permeability of formation and gravel pack after acid clean up in the injection direction when calcium carbonate particulates with a unique linear size distribution and gelled fluids of viscosity higher than 50 cps are used as leak off control materials (LCMs) against a formation or gravel pack and screens.

Figure 1:
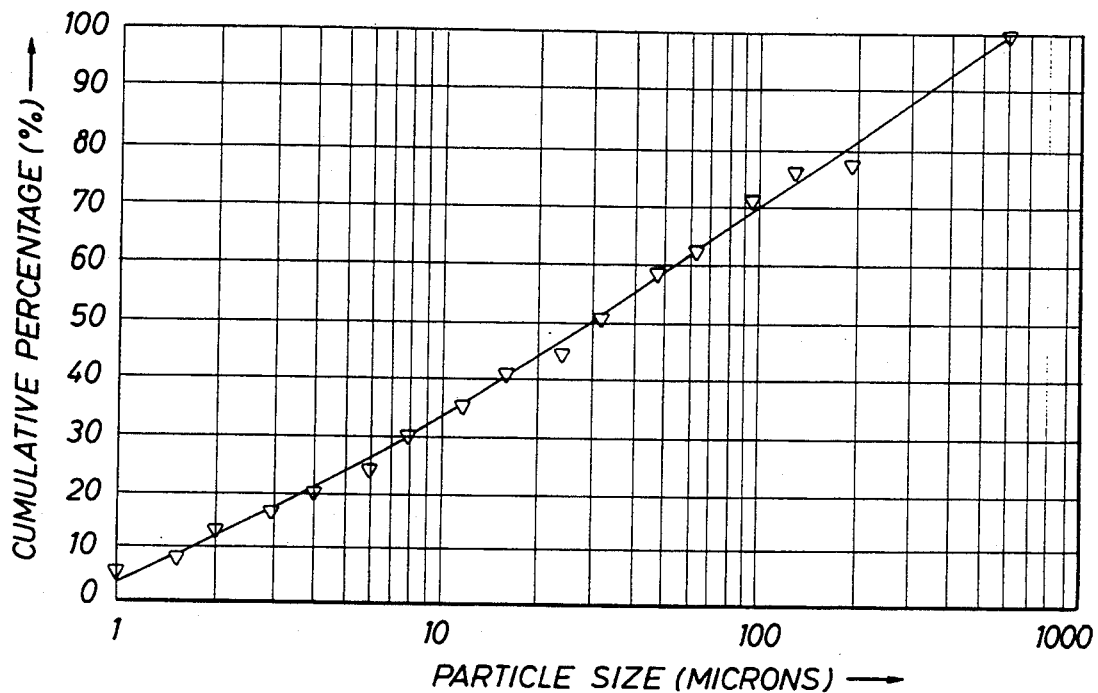

Use of an LCM comprising calcium carbonate particulate material all of a size less than 100 micron and having a linear size distribution when the cumulative weight percentage (%) is plotted against the logarithm of the particle size (micron) as shown in FIG. 1, with a gelled fluid such as hydroxyethyl cellulose (HEC) against formation results in better fluid loss control and improved permeability return of the formation after the LCM is cleaned by hydrochloric acid (HCl). Also, the use of fine carbonate particles facilitated breaking up HEC by HCl.

Examples 1-3

Figure 2:
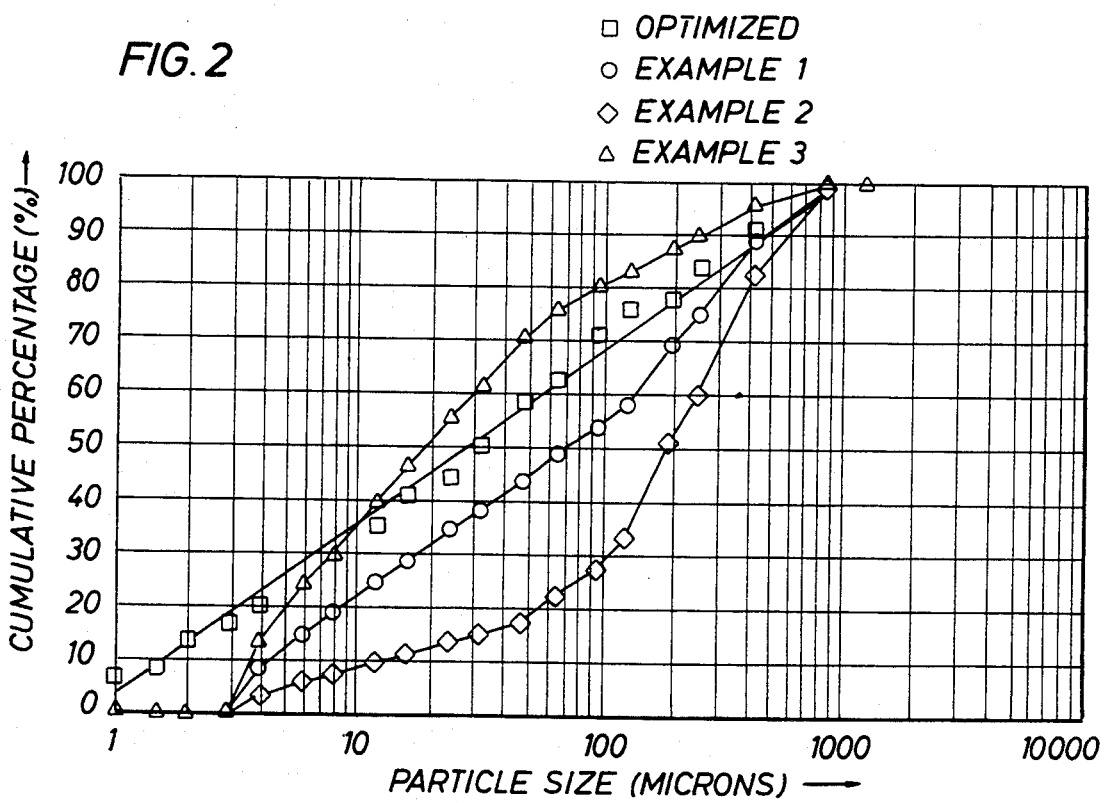

A variety of particle size distributions were evaluated in the Baroid cell for fluid loss control under test condition set A: A 0.3" thick deposit of particulate CaCO3 was put on a 1" thick of 20/40 sand pack within a Teflon sleeve. The Teflon sleeve was then placed in a Baroid cell. A 2% KCl brine was flowed through the above system at 50 psi differential pressure. The time to flow 100 ml of brine was recorded and the average fluid leak off rate was listed in Table 1. Particulate size distributions are shown in FIG. 2. These examples demonstrate that a size distribution close to the optimized linear line (Ex. 1, 3) provides a better leak-off control than the one further away from the linear line (Ex. 2).

Examples 4-6

A second variety of particle size distributions was examined for fluid loss control under test conditions which are to those in Examples 1-3 except that the 2% KCl brine was surged under 300 psi through the pack before it was flowed through at 50 psi differential pressure. The leak-off data are provided in Table 1. The particle size distributions are presented in FIG. 3. These examples further demonstrate the superior performance of a linear particle size distribution (Ex. 6 is better than Ex. 5; and Ex. 5 is better than Ex. 4). Example 6 has a desired linear shape and has the lowest leak-off rate while example 4 is close to that in example 6. But the performance is example 4 is intermediate because it has inadequate fine particles.

Examples 7-9

In examples 7-9, a variety of particle size distributions which are all close to linear but containing different amounts of particles with a size of less than 2 micron are examined under the following test conditions: The LCM was first prepared by mixing 15 g CaCO3 with 250 mls Karo syrup which has a viscosity of 50 cps. A 1" thick 20/40 sand pack was placed in a Barold cell and was prewetted. The prepared LCM was then placed in the Barold cell and deposited on the sand pack under 500 psi differential pressure. The leak-off volume was measured in various predetermined time intervals. The leak-off rate averaged over 36 min was listed in Table 1. The particle size distributions are shown in FIG. 4. Example 7 gives superior fluid loss control. This demonstrates that a significant amount of submicron size is very important to achieve lowest leak-off, while the linear size distribution allows good bridging on sand pack.

TABLE 1

Leak Off Rate of Different Particle Size Distributions

| EXAMPLE | TEST CONDITIONS | LEAK-OFF RATE (mls/min) |
|---|---|---|
| 1 | A | 14.8 |
| 2 | A | 87 |
| 3 | A | 15.5 |
| 4 | B | 18.6 |
| 5 | B | 13.7 |
| 6 | B | 7.14 |
| 7 | C | 1.45 |
| 8 | C | 8.7 |
| 9 | C | 7.2 |

It can be seen from the foregoing that the defined linear size distribution for fluid loss control particulates provide significantly improved fluid loss control which will easily and efficiently bridge over high permeability subterranean formation to achieve temporarily low permeability.

While the invention has been described in the more limited aspects of preferred embodiments thereof, other embodiments have been suggested and still others will occur to those skilled in the art upon a reading and understanding of the foregoing specification. It is intended that all such embodiments be included within the scope of this invention as limited only by the appended claims.

Having thus described our invention, we claim:

1. A gravel placement fluid consisting essentially of a viscosified aqueous carrier fluid and a selectively soluble particulate material wherein all of said particulate material has a size less than 1000 microns and has a linear size distribution when cumulative weight percent of particulate is plotted against the logarithm of the particle size.

2. The gravel placement fluid as described in claim 1 wherein the selectively soluble particulate comprises calcium carbonate.

3. The gravel placement fluid as described in claim 1 wherein said selectively soluble particulate is acid soluble.

4. The gravel placement fluid as described in claim 1 wherein said viscosified aqueous fluid has a viscosity in excess of 50 centipoise.

5. The gravel placement fluid as set forth in claim 1 further including insoluble gravel particles.

6. A method of preventing fluid loss in the placement of a gravel pack consisting essentially of a viscosified aqueous carrier fluid including gravel pack particulates; adding a fluid loss material to the placement fluid comprising selectively soluble particulate having a size less than 1000 microns and having a linear size distribution when cumulative weight percent is plotted against the logarithm of the particle size, and pumping the gravel placement fluid and fluid loss additive into a subterranean formation.

7. The process as set forth in claim 6 in which the step of providing an acid soluble particulate.

8. The process as set forth in claim 6 wherein the step of providing comprises providing calcium carbonate particulate.

* * * * *